US012536868B2

(12) United States Patent
Sanborn et al.

(10) Patent No.: US 12,536,868 B2
(45) Date of Patent: Jan. 27, 2026

(54) ELECTRONIC GAMING MACHINES, SYSTEMS, AND METHODS FOR PROVIDING ELECTRONIC GAMING WITH COMMUNITY ASPECTS

(71) Applicant: Aristocrat Technologies, Inc., Las Vegas, NV (US)

(72) Inventors: Hanna Sanborn, Georgetown, TX (US); Ramkumar Sivaraman, Cedar Park, TX (US); Bryan Oswalt, Austin, TX (US); Peter Wasielewski, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 32 days.

(21) Appl. No.: 18/364,257

(22) Filed: Aug. 2, 2023

(65) Prior Publication Data

US 2023/0377418 A1 Nov. 23, 2023

Related U.S. Application Data

(63) Continuation of application No. 16/888,173, filed on May 29, 2020, now Pat. No. 11,763,630.

(51) Int. Cl.
*G07F 17/32* (2006.01)

(52) U.S. Cl.
CPC ...... *G07F 17/3258* (2013.01); *G07F 17/3213* (2013.01); *G07F 17/3267* (2013.01)

(58) Field of Classification Search
CPC ............. G07F 17/3258; G07F 17/3213; G07F 17/3267
See application file for complete search history.

(56) References Cited

U.S. PATENT DOCUMENTS

2005/0055113 A1 3/2005 Gauselmann
2005/0282607 A1 12/2005 Gauselmann
2006/0166731 A1 * 7/2006 Yoshimi ............. G07F 17/3267 463/20
2008/0076542 A1 3/2008 Iddings
(Continued)

OTHER PUBLICATIONS

Office Action dated May 25, 2021 for U.S. Appl. No. 16/888,173 (pp. 1-13).
(Continued)

*Primary Examiner* — Jeffrey K Wong
(74) *Attorney, Agent, or Firm* — Armstrong Teasdale LLP

(57) ABSTRACT

A gaming machine is described herein. The gaming machine includes a primary display device, a player input interface, and a game controller. When executed by the game controller, the instructions cause the game controller to cause to be displayed a base game, identify a number of selected reels, and determine, for each reel, a reel symbol to be displayed after a spin of each reel. The instructions also cause the game controller to determine a game enhancement for the base game and cause to be displayed on each reel the reel symbol determined to be displayed on each reel. The instructions further cause the game controller to cause to be displayed an animation indicating the game enhancement will be provided, wherein the animation originates at a secondary display device and determine a game outcome based at least on the displayed reel symbols on each selected reel and the game enhancement.

20 Claims, 12 Drawing Sheets

(56) References Cited

U.S. PATENT DOCUMENTS

| | | | | |
|---|---|---|---|---|
| 2009/0189351 | A1 | 7/2009 | Baerlocher | |
| 2010/0240455 | A1 | 9/2010 | Gagner | |
| 2010/0248811 | A1 | 9/2010 | Jaffe | |
| 2011/0165934 | A1 | 7/2011 | Marks | |
| 2013/0059642 | A1 | 3/2013 | Gilmore | |
| 2013/0274016 | A1* | 10/2013 | Gagner | G07F 17/3218 463/34 |
| 2014/0235319 | A1 | 8/2014 | Meyer | |
| 2016/0093133 | A1* | 3/2016 | Kelly | G07F 17/3211 463/31 |
| 2016/0140795 | A1* | 5/2016 | Fong | G07F 17/3216 463/21 |
| 2016/0328910 | A1 | 11/2016 | Shaik | |
| 2017/0039812 | A1* | 2/2017 | Baron | G07F 17/3258 |
| 2018/0130285 | A1 | 5/2018 | Ang | |

OTHER PUBLICATIONS

Office Action (Final Rejection) dated Jan. 20, 2022 for U.S. Appl. No. 16/888,173 (pp. 1-14).
Office Action (Non-Final Rejection) dated Apr. 27, 2022 for U.S. Appl. No. 16/888,173 (pp. 1-17).
Office Action (Final Rejection) dated Sep. 12, 2022 for U.S. Appl. No. 16/888,173 (pp. 1-15).
Office Action (Non-Final Rejection) dated Dec. 23, 2022 for U.S. Appl. No. 16/888,173 (pp. 1-7).
Office Action (Notice of Allowance and Fees Due (PTOL-85)) dated May 15, 2023 for U.S. Appl. No. 16/888,173 (pp. 1-8).

* cited by examiner

ELECTRONIC GAMING MACHINES, SYSTEMS, AND METHODS FOR PROVIDING ELECTRONIC GAMING WITH COMMUNITY ASPECTS

CROSS REFERENCE TO RELATED APPLICATION

This application is a continuation of and claims priority to U.S. patent application Ser. No. 16/888,173, filed May 29, 2020, the contents of which are hereby incorporated by reference herein in their entirety.

TECHNICAL FIELD

The field of disclosure relates generally to electronic gaming, and more particularly, to systems and methods for providing electronic gaming with community aspects.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming machine is described. The gaming machine includes at least one primary display device, a player input interface configured to receive player input from a player, and a game controller configured to execute instructions stored in a tangible, non-transitory, computer-readable medium. When executed by the game controller, the instructions cause the game controller to at least cause to be displayed, on the at least one primary display device, a base game, identify a number of reels of a plurality of reels displayed on the at least one primary display device that are selected for play of the base game, and determine, for each reel, a reel symbol of a plurality of reel symbols to be displayed after a spin of each reel. The instructions also cause the game controller to determine a game enhancement to be applied to the base game and cause to be displayed on each reel, after a spin of the plurality of reels, the reel symbol determined to be displayed on each reel. The instructions further cause the game controller to cause to be displayed an animation indicating the game enhancement will be provided, wherein the animation originates at a secondary display device separate from the at least one primary display device included on the electronic gaming machine and determine a game outcome based at least on the displayed reel symbols on each selected reel and the game enhancement.

In another aspect, a gaming system is described. The gaming system includes at least one primary display device, a player input interface configured to receive player input from a player, and a game controller configured to execute instructions stored in a tangible, non-transitory, computer-readable medium. When executed by the game controller, the instructions cause the game controller to at least cause to be displayed, on the at least one primary display device, a base game, identify a number of reels of a plurality of reels displayed on the at least one primary display device that are selected for play of the base game, and determine, for each reel, a reel symbol of a plurality of reel symbols to be displayed after a spin of each reel. The instructions also cause the game controller to determine a game enhancement to be applied to the base game and cause to be displayed on each reel, after a spin of the plurality of reels, the reel symbol determined to be displayed on each reel. The instructions further cause the game controller to cause to be displayed an animation indicating the game enhancement will be provided, wherein the animation originates at a secondary display device separate from the at least one primary display device and determine a game outcome based at least on the displayed reel symbols on each selected reel and the game enhancement.

DETAILED DESCRIPTION

Embodiments of the present disclosure provide EGMs, systems, and methods for providing electronic gaming with community aspects. More specifically, the electronic gaming systems described herein provide at least one electronic game played on an EGM that includes a base game, wherein during play of the base game, animations may be triggered and displayed on community display devices such that they are visible and/or otherwise communicated to players on a plurality of EGMs in a bank of EGMs. For example, the gaming system may include an overhead community display, visible for each player of a plurality of players at a plurality of EGMs in a bank of EGMs. During play of a base game, a game enhancement may be provided to a player at an EGM in the bank of EGMs. When the game enhancement is provided, an animation appears that is visible for all players at EGMs in the bank of EGMs. In some embodiments, the animation may spread to at least one different EGM in the bank of EGMs such that a game enhancement is also provided at the different EGM, and so forth. Accordingly, the EGMs, systems, and methods described herein increase player excitement and sense of community while playing electronic games because game enhancements are visible to all players at EGMs in the bank of EGMs and animations associated with the game enhancements may spread from EGM to EGM. The animations are also visible to potential players near the EGMs, and may attract potential players to the bank of EGMs in order to participate in the electronic gaming described herein. Further, while game enhancements may spread from EGM to EGM, each player still plays their own personal game.

Electronic games played on the devices described herein may vary. Although the example embodiment describes gameplay similar to that of a keno game, it should be appreciated that in some embodiments gameplay may include bingo games, card games (e.g., poker games), roulette games, and other games capable of being played on EGMs. In some embodiments, a player may be able to choose which game to play at an EGM (e.g., the EGM is capable of executing any of the electronic games described herein, and a player can choose which electronic game to play). As is described below in more detail, each embodiment includes various aspects of community gameplay including game enhancements.

Figure 1:
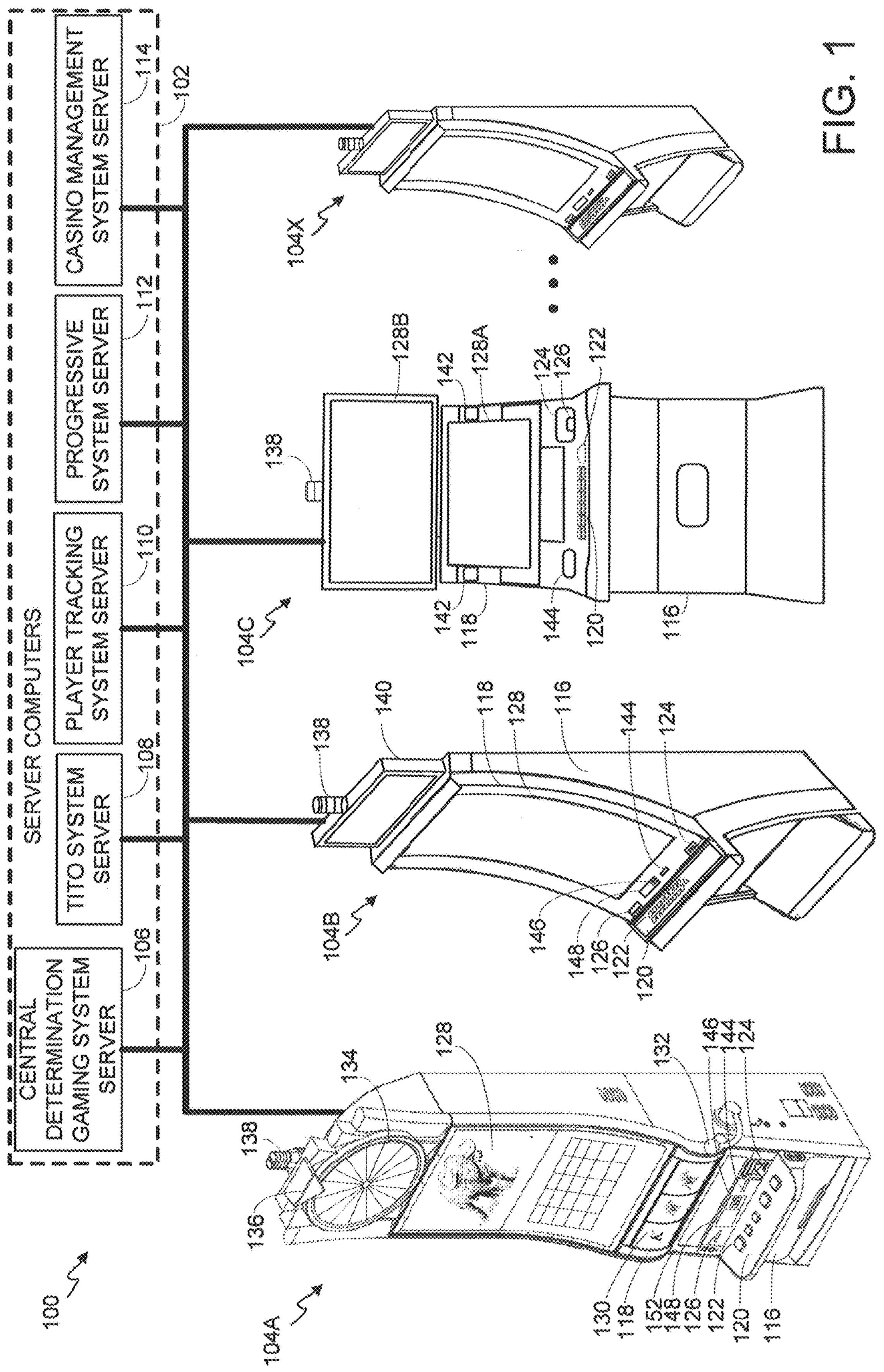
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor)

mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2A:
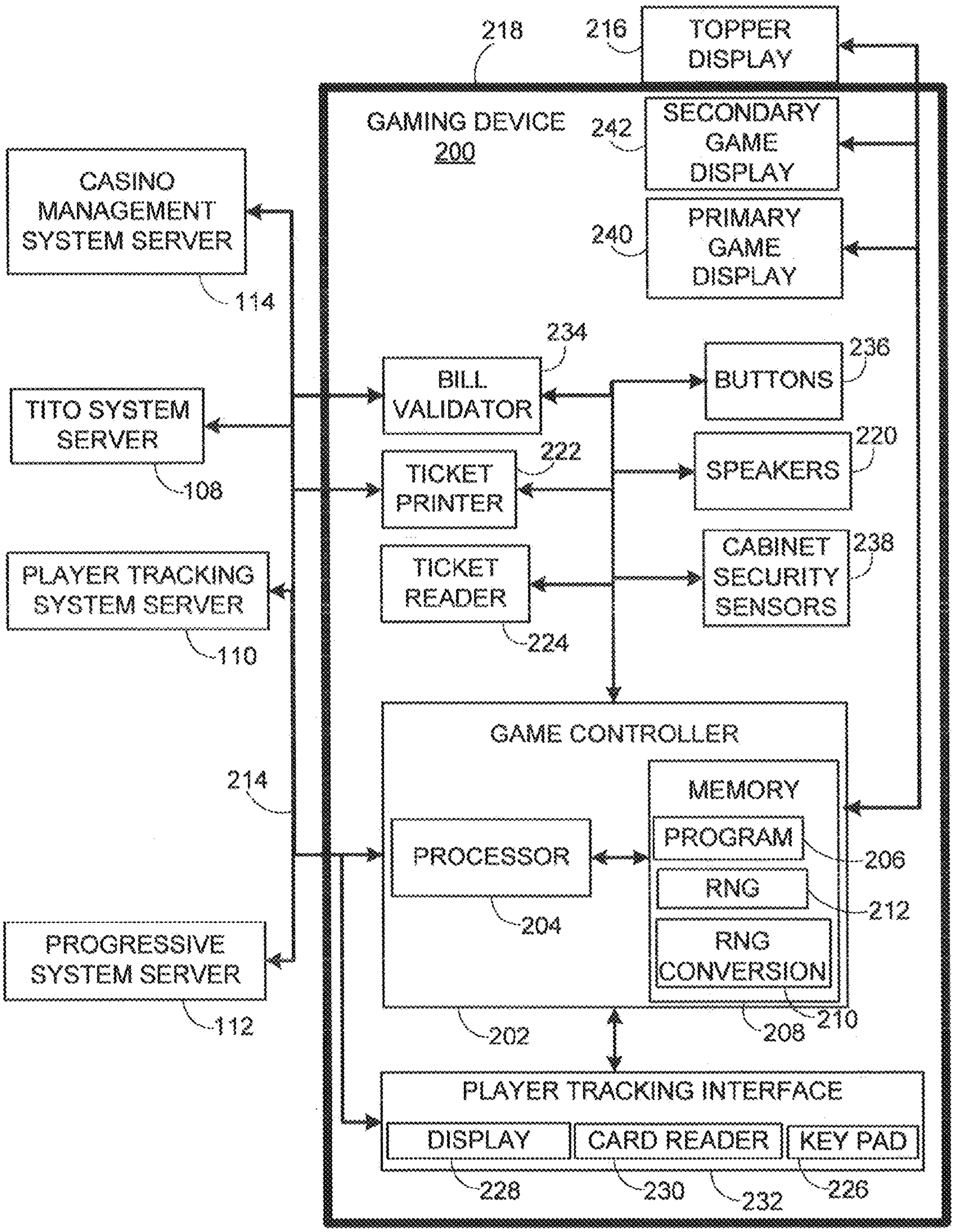
FIG. 2A is a block diagram of an example EGM that includes exemplary internal electronic components, and connections to exemplary gaming systems in accordance with the present disclosure.

FIG. 2A is a block diagram depicting exemplary internal electronic components of a gaming device 200 connected to various external systems in accordance with the present disclosure. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208. Note that embodiments of the present disclosure represent an improvement in the art of EGM software and provide new technology in that they enhance a sense of community during electronic gaming by providing game enhancements that are viewable to players at different EGMs, and in some embodiments spread from EGM to EGM. These embodiments are thus not merely new game rules or simply a new display pattern.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a “random number”).

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player’s level of patronage (e.g., to the player’s playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be “cashed-in” for money or inserted into another machine to establish a credit balance for play.

Although FIGS. 1 and 2A illustrate specific embodiments of a gaming device (e.g., gaming devices 104A-104X and 200), the disclosure is not limited to those embodiments shown in FIGS. 1 and 2A. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
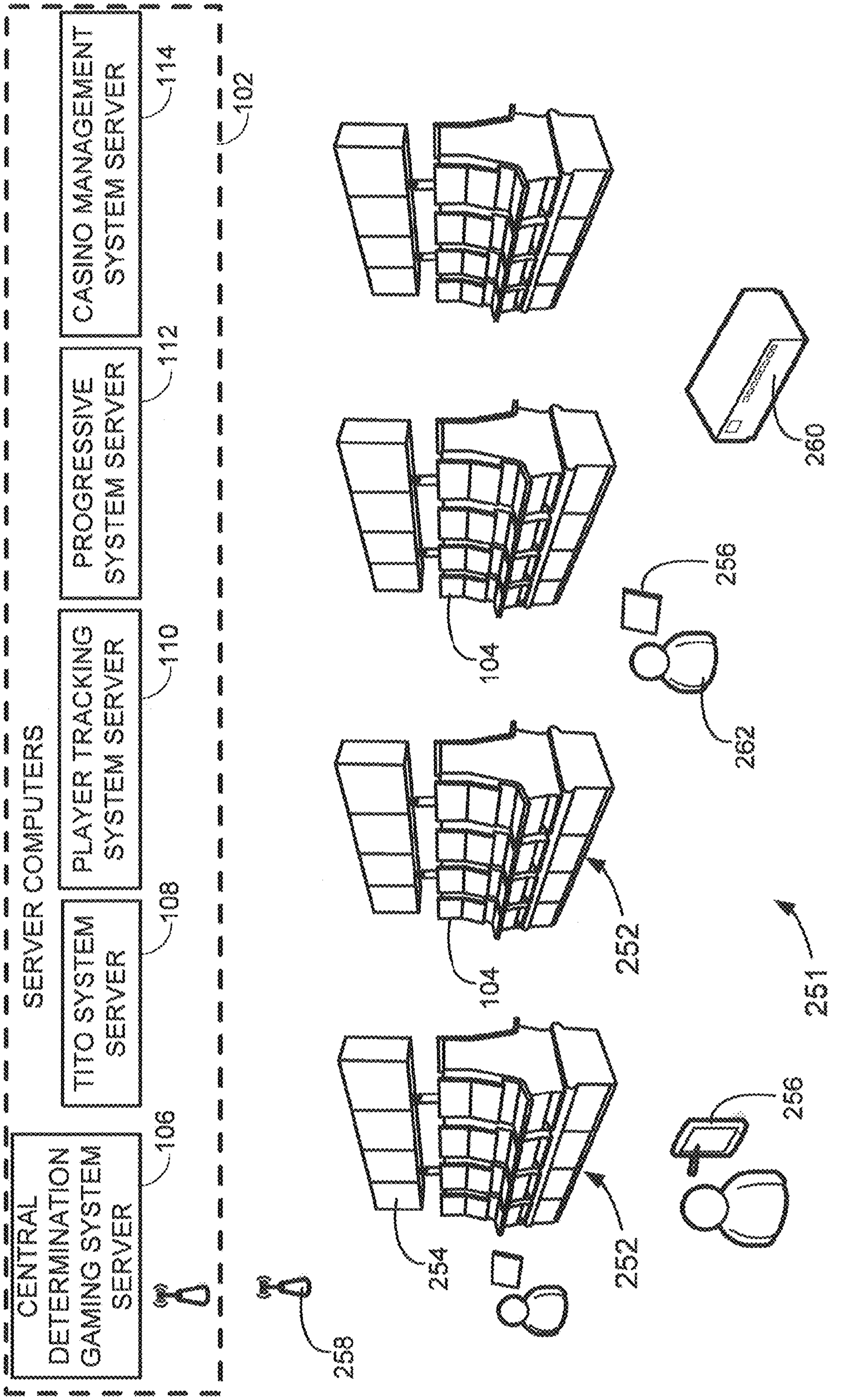
FIG. 2B depicts an example casino gaming environment in accordance with the present disclosure.

FIG. 2B depicts an example casino gaming environment in accordance with the present disclosure. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
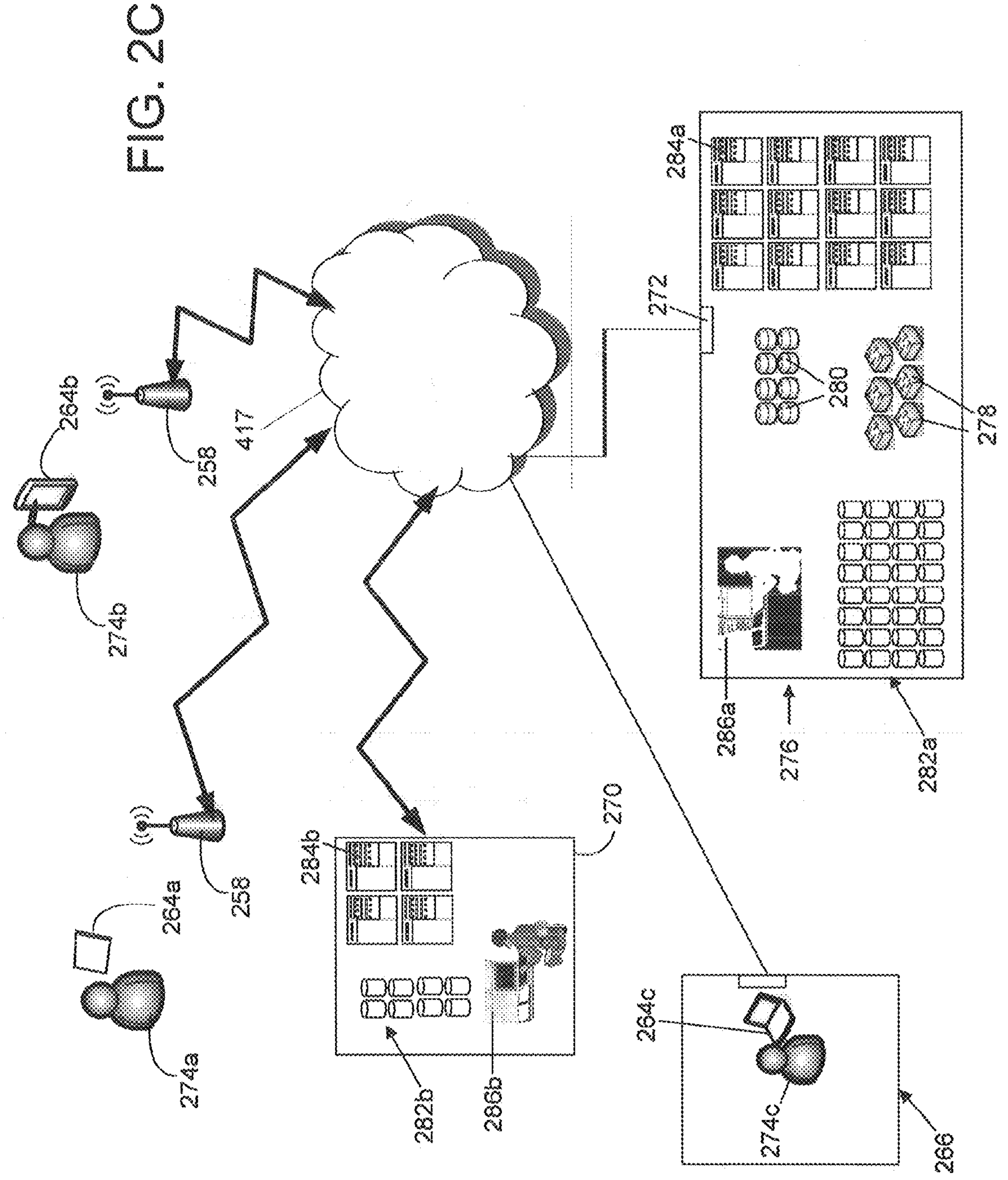
FIG. 2C is a diagram that shows examples of components of a system for providing online gaming in accordance with the present disclosure.

FIG. 2C is a diagram that shows examples of components of a system for providing online gaming in accordance with the present disclosure. As with other figures presented in this disclosure, the numbers, types and arrangements of gaming devices shown in FIG. 2C are merely shown by way of example. In this example, various gaming devices, including, but not limited to, end user devices (EUDs) **264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2**C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices **282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a*** onto which code for the selected game has been loaded may provide the game according to selections made by a player and indicated via the player's EUD.

In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations, one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
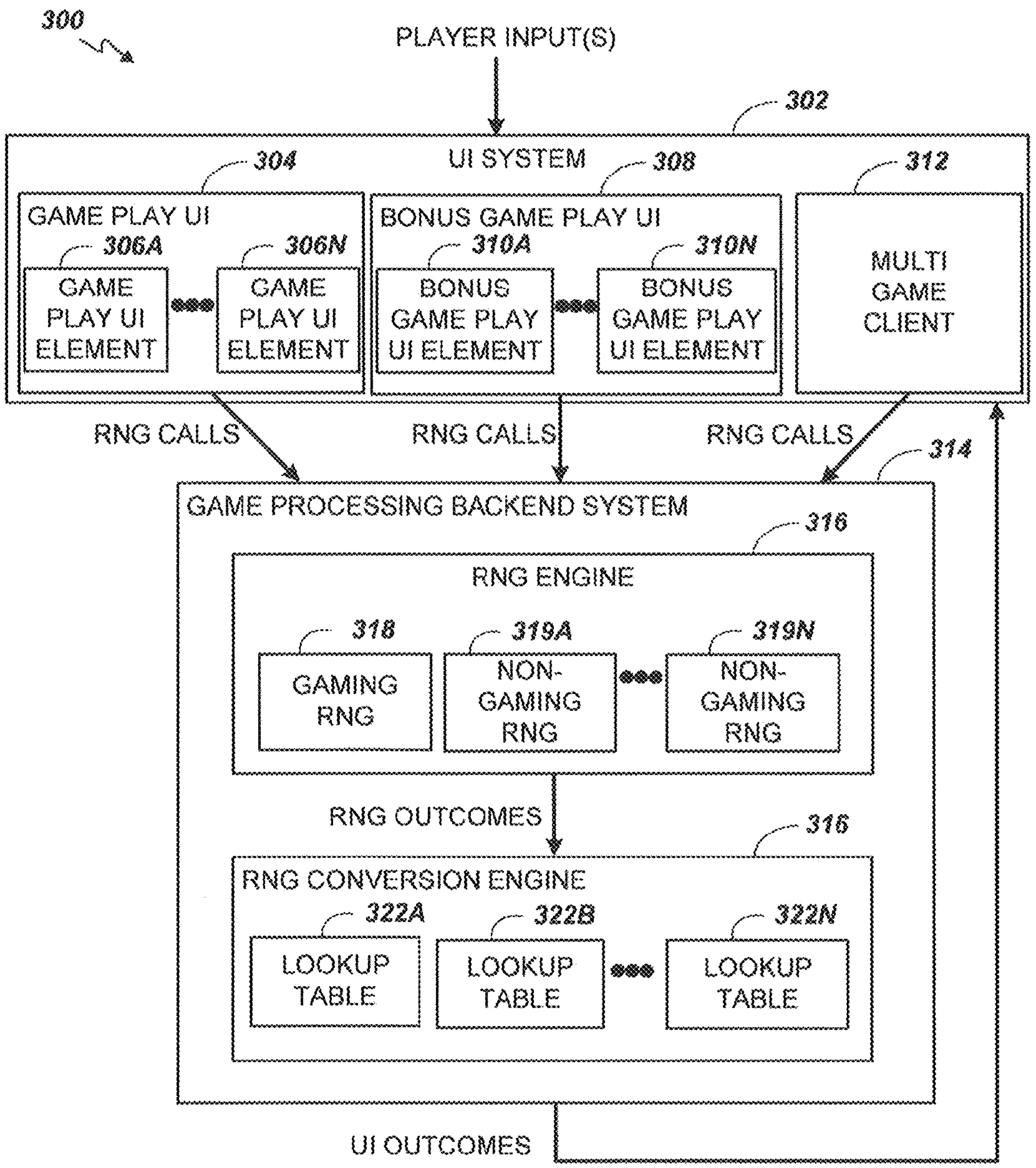
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
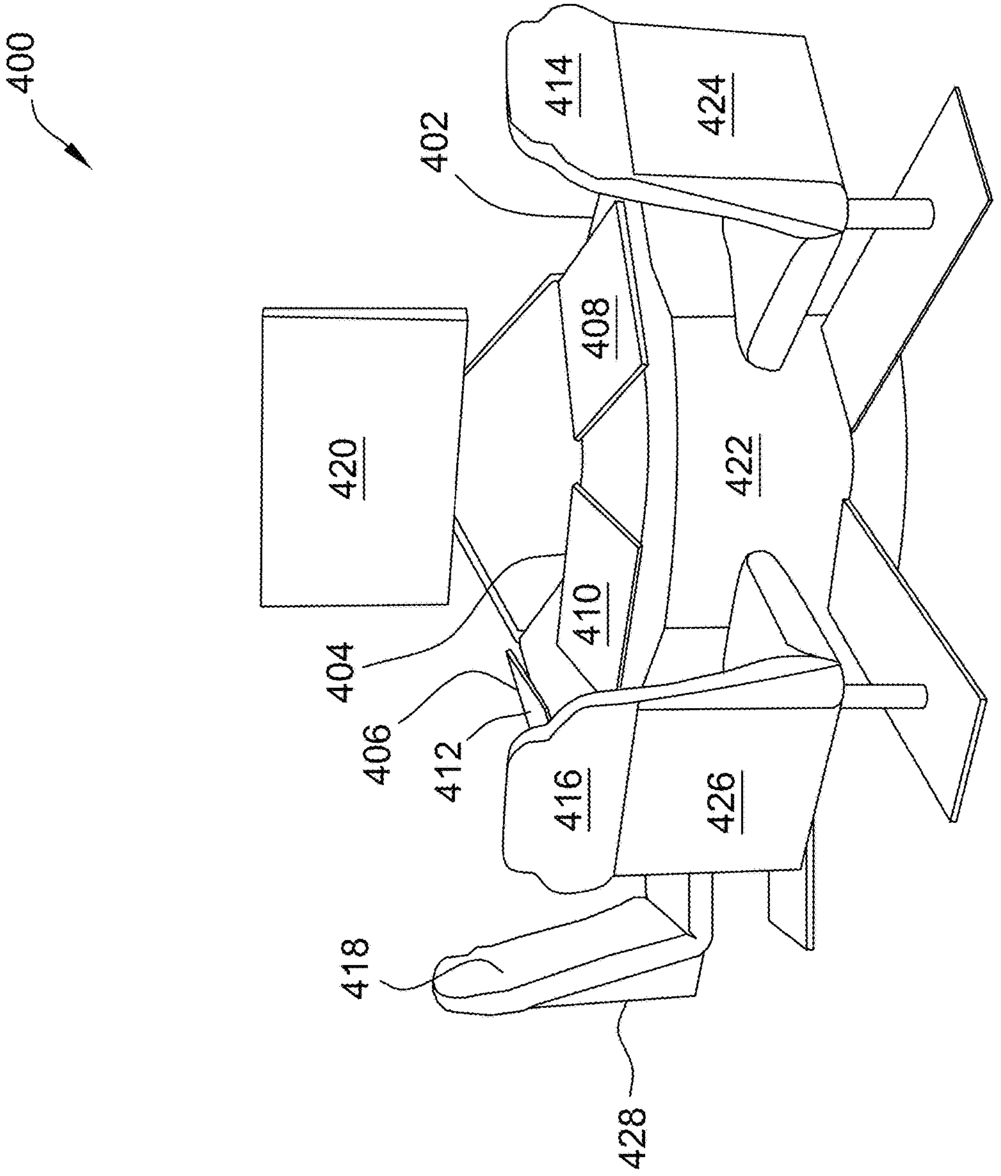
FIGS. 4-5 are example community gaming environments including EGMs and display devices as described herein.

FIG. 4 demonstrates an example community gaming environment 400 including EGMs 402, 404, 406 with display devices 408, 410, 412 as described herein. Environment 400 also includes a gaming chair 414, 416, 418 for each EGM 402-406, and a community overhead display device 420. In the example shown in FIG. 4, EGMs 402-406 are included in a gaming table 422. In some embodiments, gaming table 422 includes any number of display devices such that animations can be displayed on all, or at least a portion, of gaming table 422. In some embodiments, EGMs may be grouped in any fashion, such as being included in a bar top, as an example. In some embodiments, gaming chairs 414-418 include chair display devices 424, 426, 428 that may be similar to any of the display devices described herein. In some embodiments, EGMs 402-406 embody any of EGMs 104A-104X and display devices 408-412 embody any of displays 128, 128A.

In the example shown in FIG. 4, players at EGMs 402-406 play their own individual wagering game, however a community aspect is also included. A community aspect may include, for example, a game enhancement that is presented to a player during play of a wagering game, including an animation visible to all players at or near gaming table 422. Game enhancements may also spread from EGM to EGM (e.g., such that game enhancements are provided at each EGM), with corresponding animations spreading across table 422 and any of the display devices described in environment 400.

In the example embodiment, game controllers (e.g., game controller 202) of EGMS 402-406 determine when a game enhancement will be provided during play of a game. The game controllers of EGMs 402-406 may utilize an RNG (e.g., RNG 212) and an RNG conversion engine (e.g., RNG conversion engine 210) to determine when a game enhancement will be provided. Upon determining a game enhancement will be provided, the game controller communicates with a central server associated with table 422 (e.g., central server 106), and the central server initiates display of an animation indicating the triggering of the game enhancement (e.g., on community overhead display device 420). For example, the central server may control one or more of the display devices in environment 400 to display an animation associated with a game enhancement.

For example, say gameplay at EGM 402 triggers a game enhancement. Accordingly, a game enhancement animation in environment 400 is triggered (e.g., by a central server in communication with EGM 402). In the example embodiment, the game enhancement animation includes lightning bolts. In some embodiments, a game enhancement animation may originate at overhead display device 420. In the example of a lightning bolt animation being the game enhancement animation, an animation of a lightning bolt may originate at overhead display 420 and appear to "strike" EGM 402 including display device 408. The animation may be shown on all display devices associated with EGM 402, such as display device 408 and display device 424. In some embodiments, the animation may travel around the entirety of, or a portion of, table 422 before ending at EGM 402. Accordingly all players at EGMs 402-406 at table 422 will have increased excitement as the animation travels around table 422 in environment 400 hoping that the lightning animation ends at their EGM, and they are awarded with a game enhancement.

In some embodiments, once the game enhancement has been applied to a game, a visual representation, perhaps the same or similar to the game enhancement animation, may remain at at least one display device associated with the EGM executing the game with the game enhancement. Furthering the example described above, if a game enhancement is provided at EGM 402, display devices 408 and 424 may display an animation different from display devices 410, 412, 426, and 428, in order to indicate that gameplay on EGM 402 is currently enhanced with the game enhancement. For example, display devices 408 and 424 may continue displaying lightning bolts, or other animations, to indicate a game enhancement is currently being applied to gameplay executed by EGM 402.

In some embodiments, the game enhancement animation may be displayed as moving from one EGM to another EGM. Continuing the example described above, after, or during, gameplay on EGM 402 includes a game enhancement, a player at EGM 406 may be awarded with a game enhancement. The game enhancement animation may originate at EGM 402 (e.g., at display device 408 and/or portions of table 422 near EGM 402), and travel to EGM 406, thus "passing through" EGM 404. Accordingly, the game enhancement animation gives players of EGMs 402-406 a sense of community in that game enhancement animations travel from display devices on or near one EGM 402-406 to another EGM 402-406.

Figure 5:
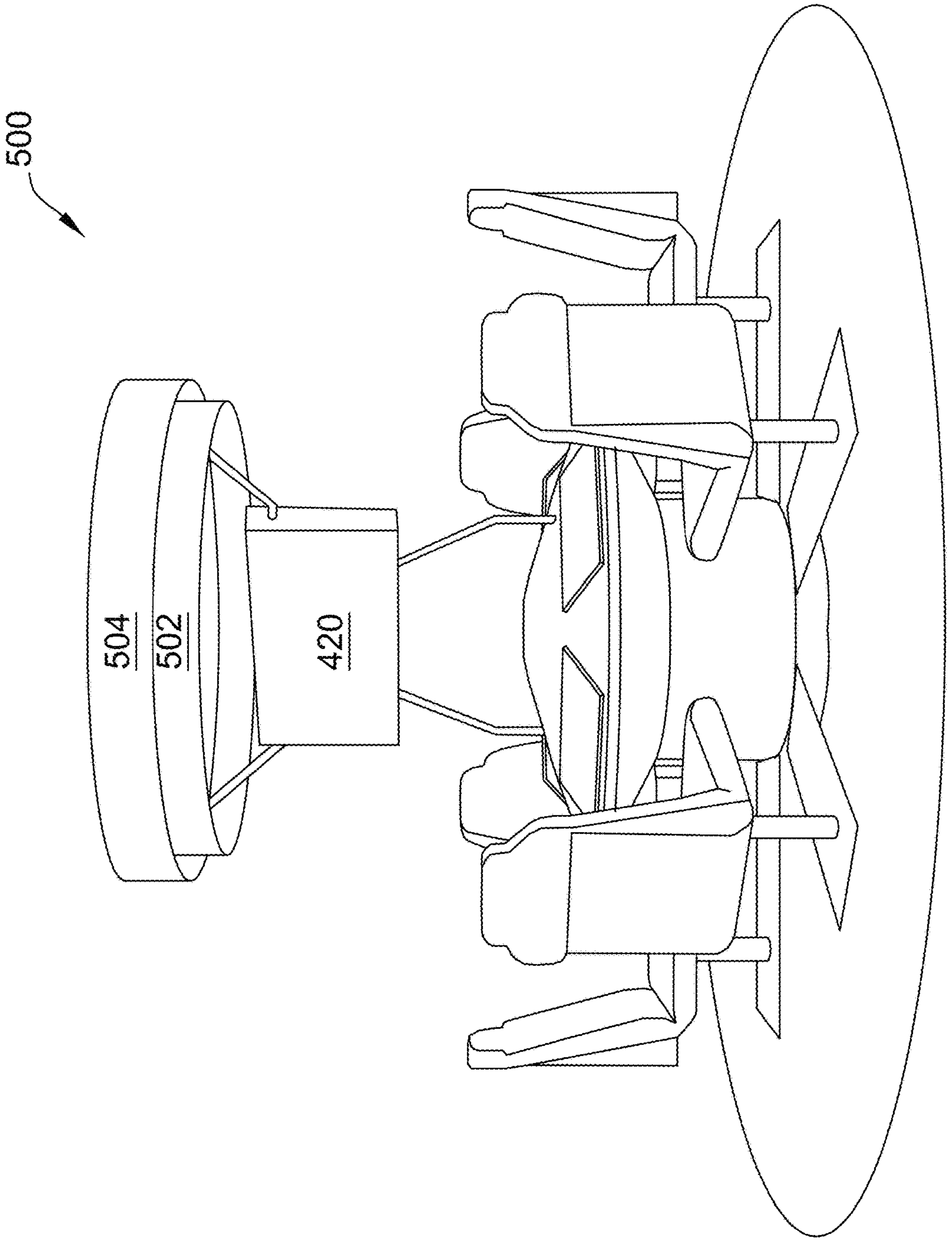

FIG. 5 is an example community gaming environment 500, similar to environment 400. Environment 500 demonstrates an embodiment of environment 400, including overhead display device 420, additional overhead display devices 502, 504, and a plurality of EGMs and display devices associated therewith. In the example shown in FIG. 5, overhead display devices 502, 504 may display further enhancement animations similar to as was described above. For example, overhead display device 420 may display information relating to gameplay on the plurality of EGMs, such as progressive jackpot amounts for progressive jackpots associated with the plurality of EGMs, while overhead display devices 502, 504 may display enhancement animations that have not yet been associated with gameplay on an EGM.

For example, continuing the example described above, lightning animations may be displayed on overhead display devices 502, 504 giving the appearance that they are preparing to "strike" an EGM below and indicate the initiation of a game enhancement of gameplay on an EGM as described herein. In some embodiments, the game enhancement animation on overhead display devices 502, 504 may change (e.g., increase in size, brightness, quantity, etc.) before a game enhancement is applied to gameplay on an EGM, indicating, for example, a game enhancement is about to be applied or there is a higher likelihood a game enhancement will be applied in the near future.

Although environments 400 and 500 are described above, it should be appreciated that many different environments, including any number of, as examples, EGMS (e.g., EGMS 402-406), display devices (e.g., display devices 408-412), tables (e.g., table 422) are further examples of embodiments as described herein. For example, in some embodiments, table 422 may be configured to be a bar top wherein animations may be displayed as going from one position on the bar top to a different position on the bar top. As another example display devices and tables as described herein may be configured to be used in an arena-type environment (e.g., for E-sports competitions). The various display devices described herein may display animations associated with a particular game being played during the competition in order to communicate information (e.g., to other players, fans, and online viewers of the competition, etc.). A plurality of tables 422, for example, may be linked together for purposes of an E-sports competition, with each table 422 facing a community display device (e.g., community overhead display device 420) that may display information regarding the competition (e.g., player/team standings, results, etc.). For example, different animations may be displayed on display devices of the tables when a particular player and/or team achieves certain objectives in a game being played. Implementation of different embodiments of the environments described herein help increase excitement of players and/or viewers, while also visually communicating important information to all players/viewers to further increase a community feel associated with use of the environments described herein.

Figure 6:
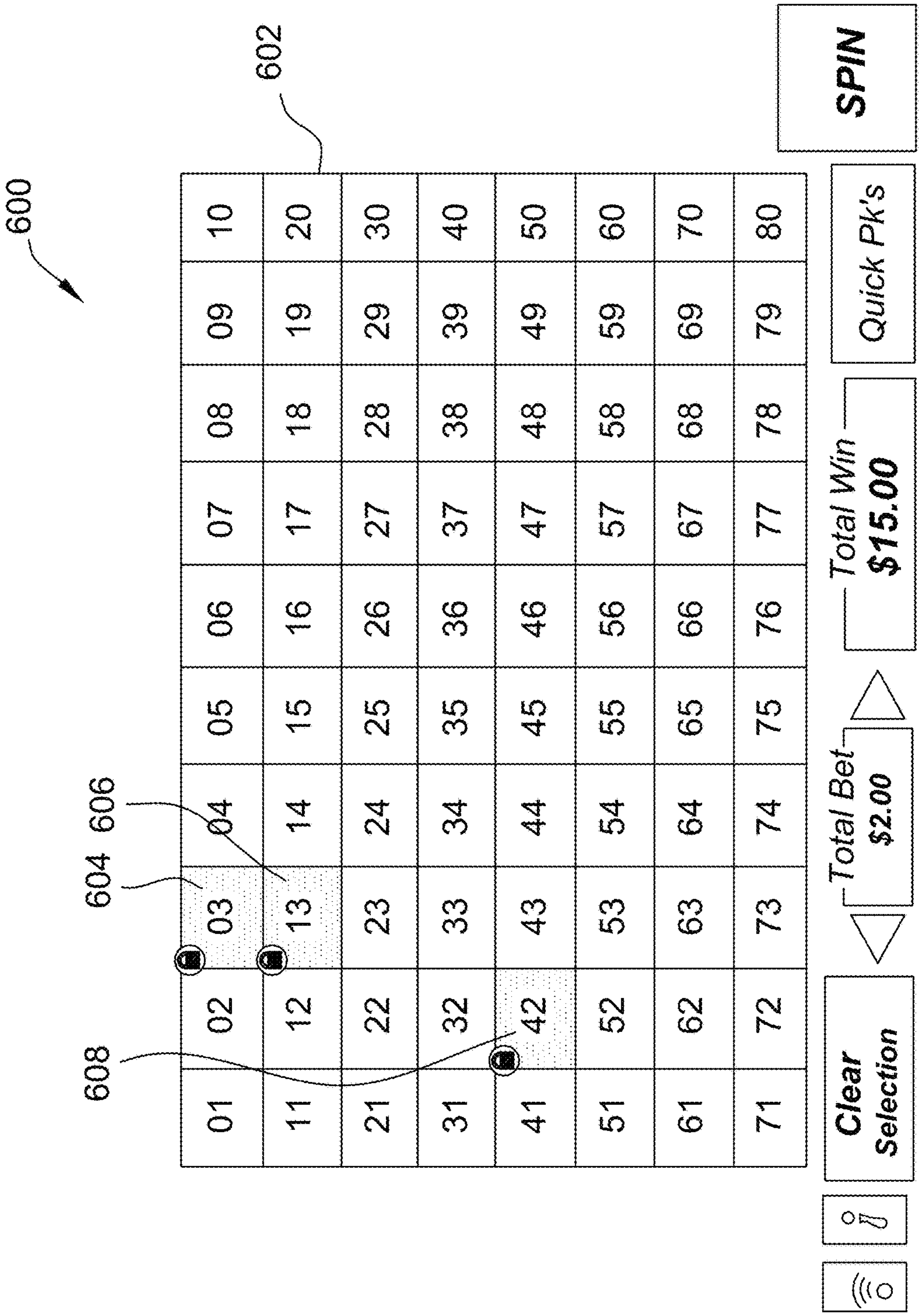
FIGS. 6-7C are example display areas displayed during a base game in accordance with the present disclosure.

FIG. 6 is an example display area 600 displayed on a display device (e.g., display devices 408-412) of an EGM (e.g., EGMs 402-406) during play of a base game. Displayed in display area 600 are a plurality of positions 602 (one through eighty), resembling that of a keno-style game. In some embodiments, any number of positions may be displayed in display area 600. In the example embodiment, each of the plurality of positions 602 includes a reel to be spun during play of the game (e.g., each position of plurality of positions 602 is an individual reel).

In the example embodiment, a player may select a number of positions, of plurality of positions 602, to be selected/identified during the base game. For example, as shown in FIG. 6, a player has selected positions 604, 606, and 608, corresponding to numbers three, thirteen, and forty two respectively. Accordingly positions 604, 606, and 608 have a lock symbol displayed thereon, and appear lighter/brighter than the other positions in display area 600. Upon a player initiating play of the base game (e.g., by selecting the "SPIN" option shown in FIG. 6) each of the reels at the plurality of positions 602 are spun, whether selected or not. In some embodiments, a minimum number of positions are required to be selected in order to initiate play of the base game. Accordingly, if the player has not chosen up to the minimum number of positions needed to initiate base game play, a game controller (e.g., game controller 202), or any other computing device described herein, may select the number of remaining positions (e.g., by utilizing an RNG such as RNG 212) required to meet the minimum number of positions requirement. Notably, even reels included in positions that are not selected for the base game are still spun along with reels included in positions that are selected for the base game.

In some embodiments, there may be a maximum number of positions a player may select during any single play of the base game (e.g., twenty positions). In some embodiments, a player may change the player-selected positions for future plays/spins of the base game, and/or request different positions be selected by, for example, the game controller. In some embodiments, a game controller may select all of the positions (e.g., all twenty) for the player. In these embodiments, the game controller may randomly select the positions before a reel spin occurs, or after a spin of the reels is complete (e.g., increasing player excitement and anticipation because the player hopes a position with a prize symbol (e.g., prize symbol 616) displayed thereon is selected). In the example described above, all of the positions include at least one reel that is spun during the base game. In some embodiments, only reels at selected positions (e.g., selected by a player or automatically by a computing device) are spun. In some embodiments, reels stop spinning at different times during a particular play of the base game. As an example, reels at selected positions may stop one-by-one as a play of the base game proceeds. Further, after the reels at the selected positions have stopped, reels at un-selected positions may stop. In some embodiments, where a game controller or other computing device selects positions for a player, the reels at positions not selected by the player, but selected by the game controller or other computing device, may stop one-by-one during play of the base game to indicate to the player which positions were selected that the player did not manually select. These example embodiments increase player enjoyment during play of the base game described herein because play of the base game persists as each selected reel stops one-by-one, and then awards displayed at positions not selected (e.g., not awarded the player) only appear at the very end of the base game when the player can quickly initiate another play of the base game and not focus on the displayed awards that they did not win (e.g., awards displayed at positions that were not selected).

Figure 7A:
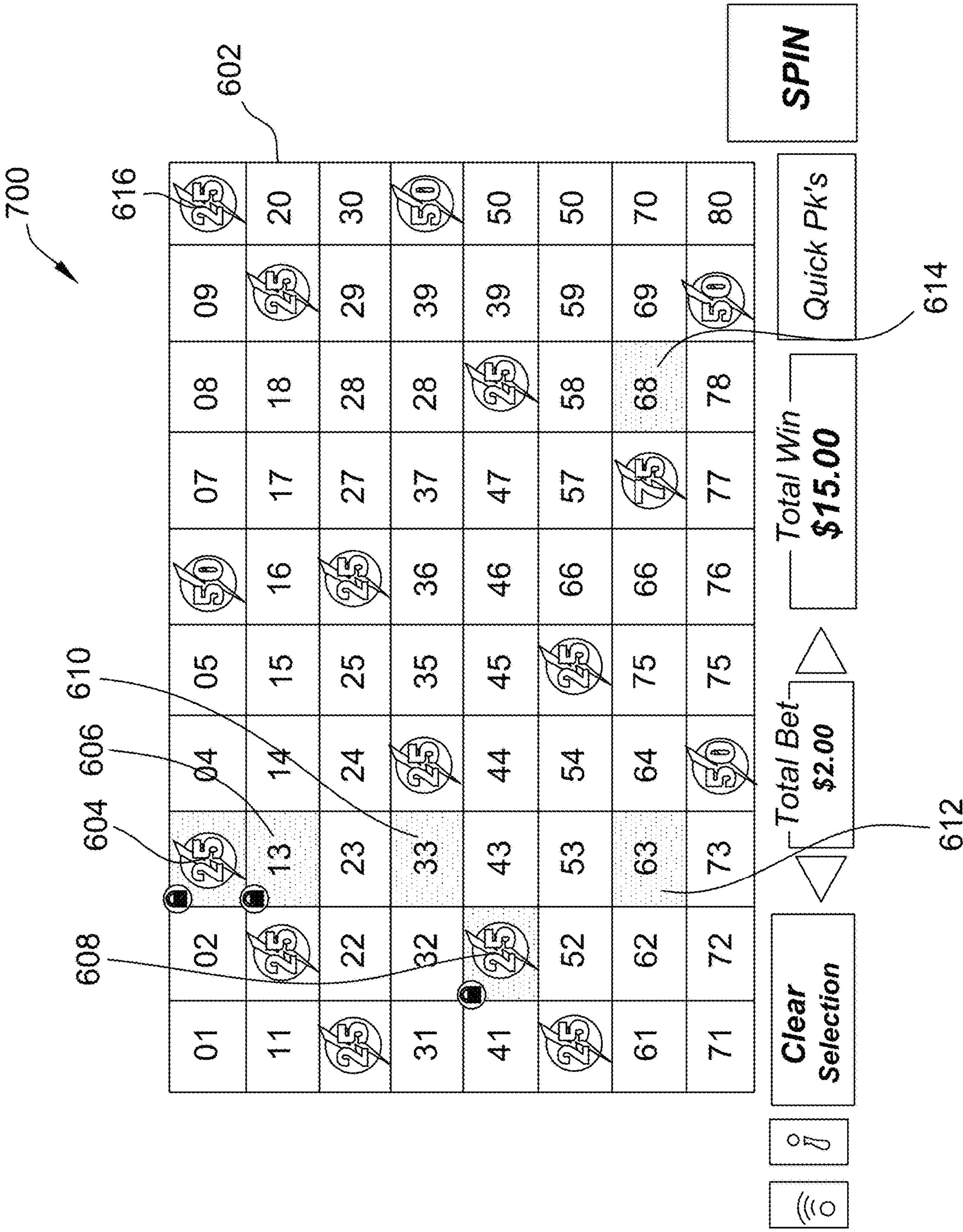

FIG. 7A is an example display area 700 displayed on a display device (e.g., display devices 408-412) of an EGM (e.g., EGMs 402-406) after a play of a base game as described above with respect to FIG. 6. Accordingly, positions 604, 606, and 608 are still selected (e.g., with a lock symbol shown and a brighter background). In this example, six positions were required to be selected before play of the base game could be initiated. Accordingly, positions 610, 612, and 614 correspond to positions that were randomly selected by a game controller (e.g., game controller 202 utilizing RNG 212 as described above). Some positions of plurality of positions 602 include a prize symbol 616 displayed therein. In the example embodiment, a player only wins prize values associated with prize symbols displayed in the selected positions. Accordingly, any selected spaces (e.g., positions 604-614) with a prize symbol 616 displayed therein indicate award amounts the player has won during that play of the base game. For example, as shown in FIG. 7A, positions 604 and 608 include prize symbols 616 displayed therein. Accordingly, the player has won fifty credits (twenty-five for prize symbol 616 displayed at position 604 and twenty-five for prize symbol 616 displayed at position 608).

It should be noted that prize symbols are selected from a plurality of prize symbols, wherein prize symbols may be associated with different values. For example, the plurality of prize symbols may include prize symbols indicating different prize values (e.g., as shown in FIG. 7A as "25", "50", and "75") and/or prize symbols indicating a jackpot win (e.g., progressive jackpot symbols including "MINI," "MINOR," MAJOR," etc.). In some embodiments, the plurality of prize symbols may include blank symbols (e.g., symbols with no value associated therewith). In the example embodiment, all symbols displayed on positions of plurality positions 602 are "what you see is what you get" (WYSIWYG) symbols. In other words, the symbols themselves indicate the prize value associated therewith (e.g., by being a number, such as "25", "50", or "75" as shown in FIG. 7A).

Figure 7B:
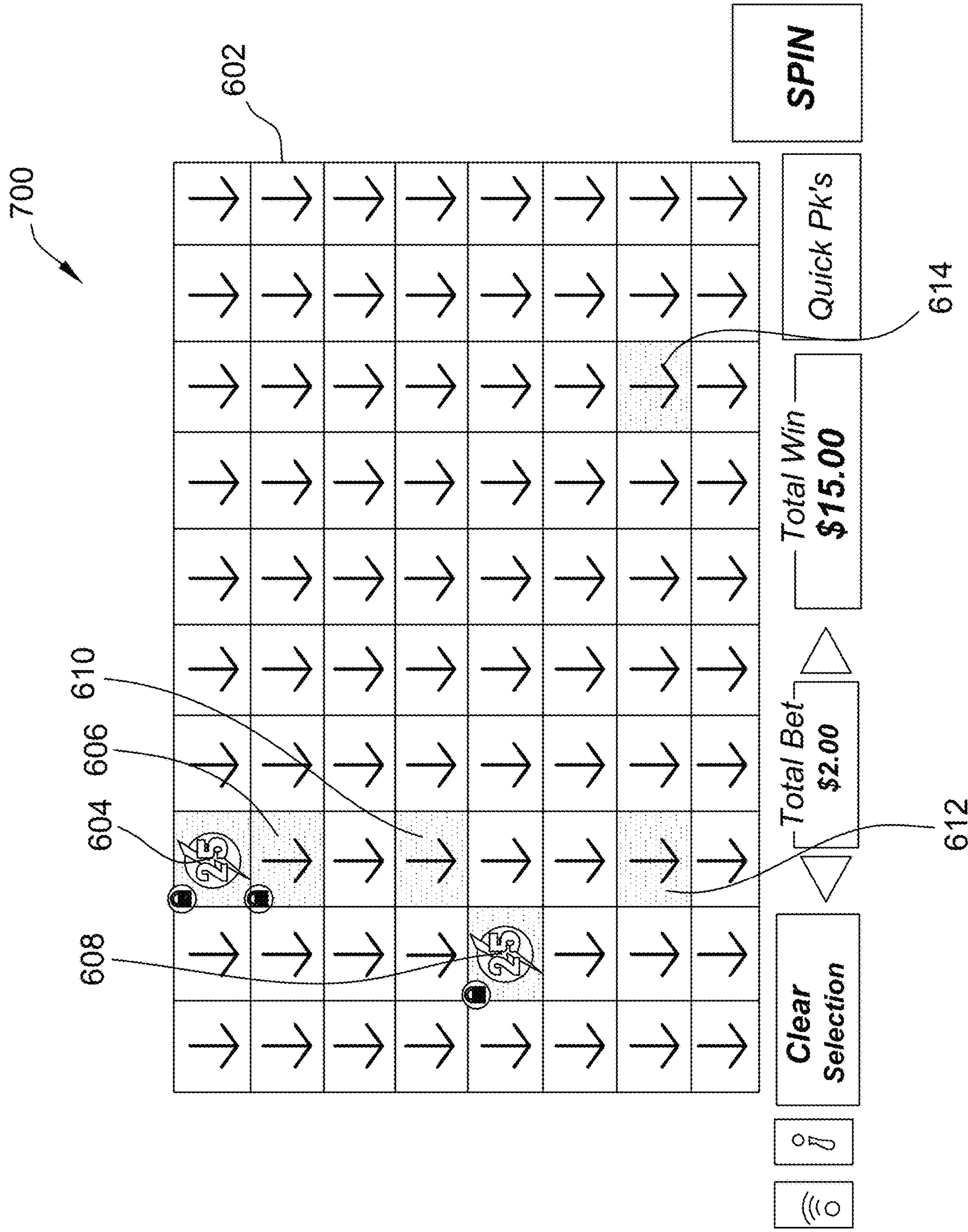

FIG. 7B is an example display area 700 displayed on a display device (e.g., display devices 408-412) of an EGM (e.g., EGMs 402-406) during play of the base game described above with respect to FIG. 7A. Because prize symbols 616 were displayed at positions 604 and 608 after a first play of the base game described above, prize symbols 616 remain at positions 604 and 608 during a subsequent play of the base game as shown in FIG. 7B. Accordingly, each of the reels associated with positions other than positions selected by the player with prize symbols displayed thereon (e.g., positions 604, 608) are spun (e.g., as indicated by arrows in FIG. 7B).

Figure 7C:
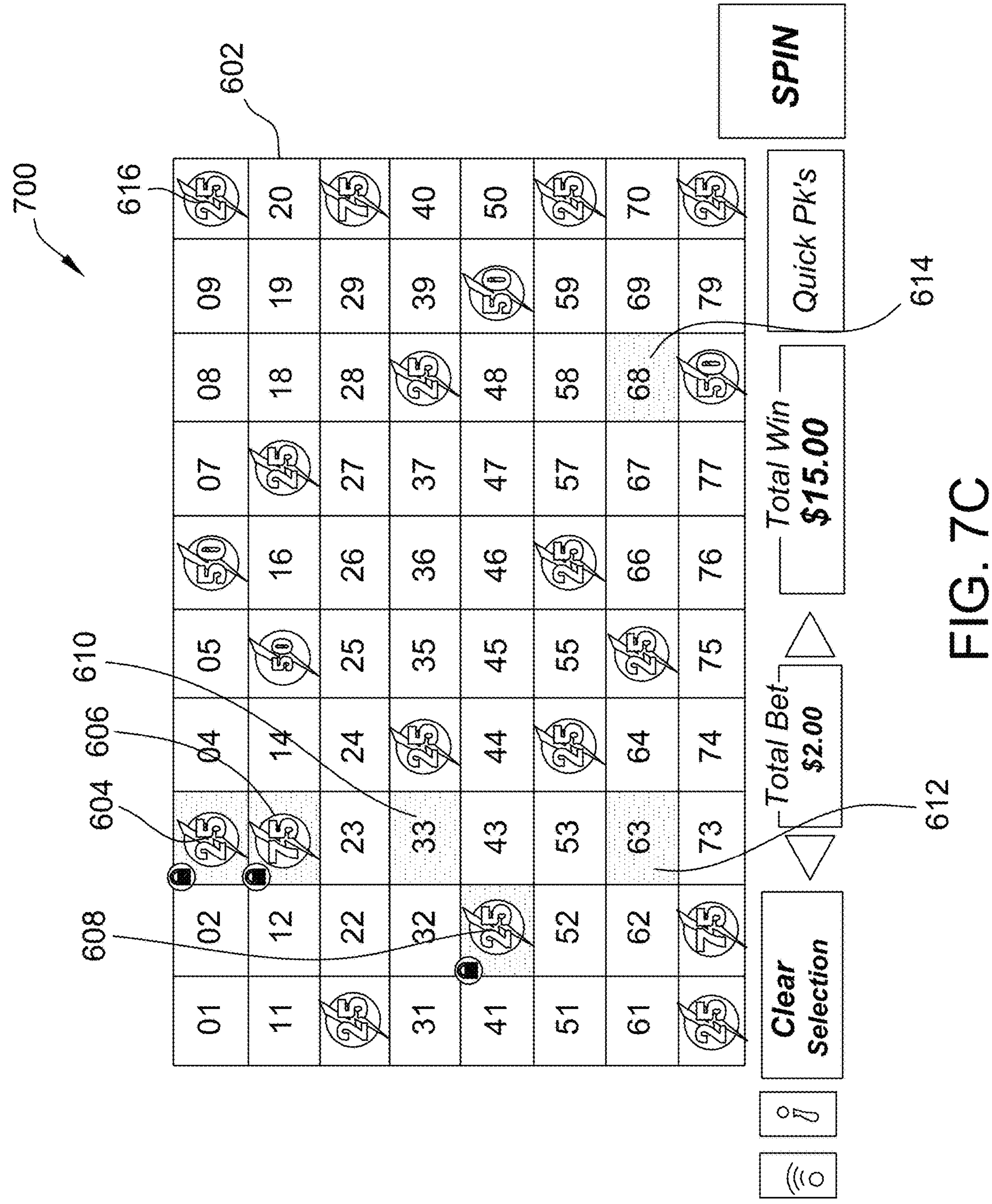

FIG. 7C is an example display area 700 displayed on a display device (e.g., display devices 408-412) of an EGM (e.g., EGMs 402-406) after play of the base game described above with respect to FIG. 7B. After reels are spun as described above, prize symbols 616 are displayed at positions according to a game outcome different than the outcome described above with respect to FIG. 7A. However, prize symbols 616 displayed at selected positions (e.g., positions 604 and 608) remain displayed because the reels associated with positions 604 and 608 were not spun.

As shown in FIG. 7C, a prize symbol 616 is now displayed at position 606. Accordingly, during future plays of the base game, prize symbol 616 displayed at position 606 will remain and the reel associated therewith will not be spun until a new base game is started. If a player stops playing the game after the outcome shown in FIG. 7C displayed, the player would be awarded with at least the prize values associated with prize symbols 616 displayed at selected positions (e.g., 125 credits because of the "25" prize symbols displayed at positions 604 and 608, and the "75" prize symbol displayed at position 606).

As described above, game enhancements may be triggered during play of the base game. A game enhancement may be any way of enhancing the player experience during play of the base game. As examples, a game enhancement may be selection of additional reels (e.g., in addition to and different from previously selected/identified reels), application of a multiplier to a value associated with a displayed prize symbol, otherwise increasing the value associated with a displayed prize symbol, or an increase of a progressive jackpot. In some embodiments, a game enhancement may be the triggering of a bonus game. In some embodiments, a bonus game may be triggered by display of a number of prize symbols at the selected positions during play of a base game (e.g., if prize symbols are displayed at at least six selected positions). In some embodiments, prize symbols displayed at selected positions during the base game may remain in play during play of the bonus game, while reels at other positions are spun during play of the bonus game, as shown in FIG. 8.

Figure 8:
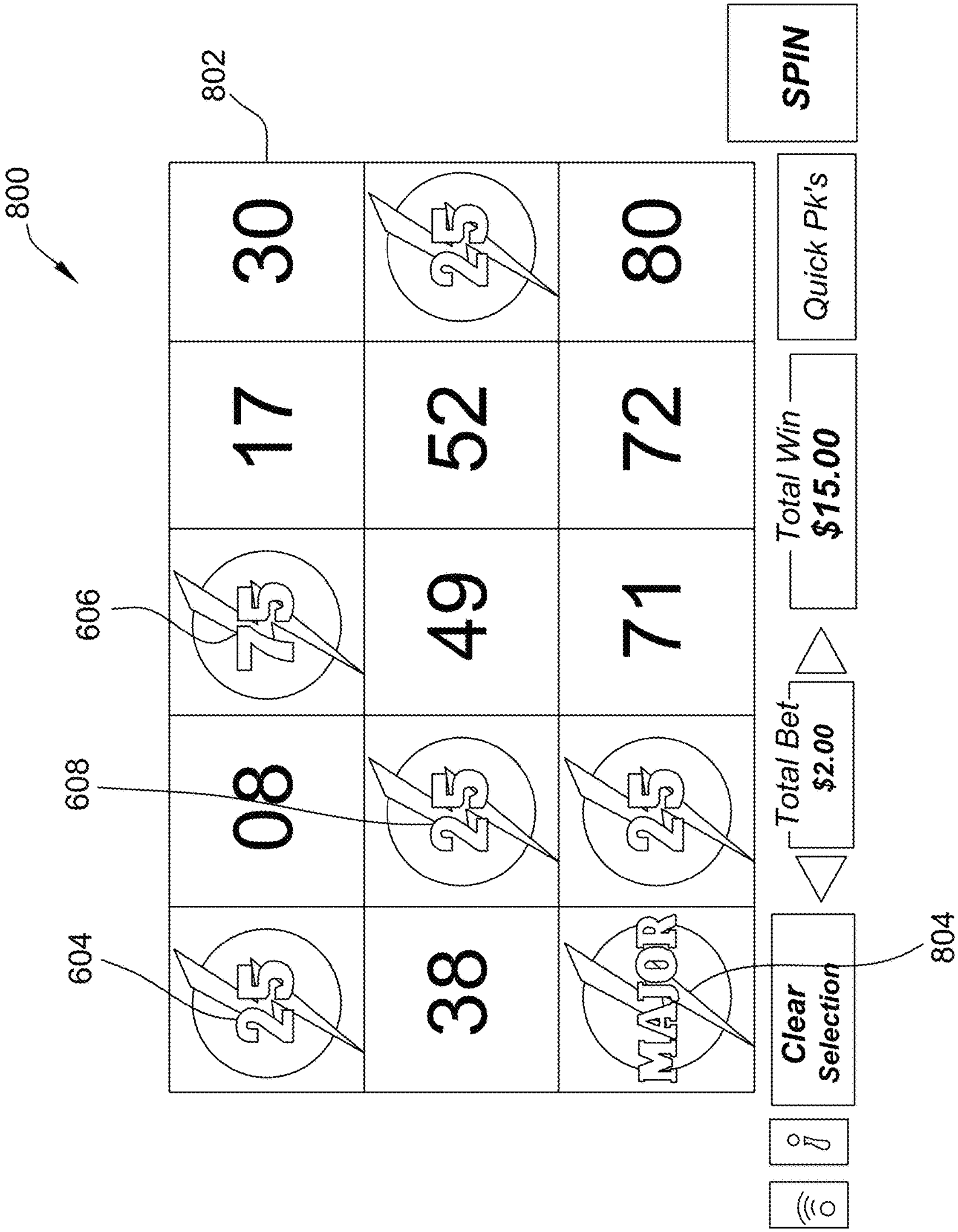
FIG. 8 is an example display area displayed during a bonus game in accordance with the present disclosure.

FIG. 8 is an example display area 800 on a display device (e.g., display devices 408-412) of an EGM (e.g., EGMs 402-406) during play of a bonus game as described above. In the example embodiment, when the bonus game is triggered, plurality of positions 602 is modified based on reel symbols (e.g., prize symbols 616) displayed on selected reels such that fewer positions of the plurality of positions are displayed in a bonus game display area 802 (e.g., wherein the plurality of positions are converted to be included on bonus game reels). However, selected positions with prize symbols displayed thereon are kept/locked (e.g., remain in play) for the bonus game. For example, positions 604-608 with prize symbols displayed thereon are displayed in display area 802. The remaining positions needed to fill bonus game display area 802 are chosen at random (e.g., positions 08, 17, 30, 38, etc. as shown in FIG. 8). Although bonus game display area 802 is a 3×5 configuration in the example embodiment shown in FIG. 8, it should be noted that bonus game display area may be of any configuration (e.g., 5×5, etc.).

In the example embodiment, bonus game play is similar to base game play, other than that during bonus game play a player is awarded an initial number of free spins and, upon completion of the bonus game, the player is awarded with values associated with bonus symbols displayed at any position in bonus game display area 802, not just selected positions as was the case in the base game (e.g., there are no specific "selected" positions in the bonus game). For example, upon triggering of the bonus game, a player may be awarded ten free spins. For each spin, any prize symbols already being displayed are locked, and positions/reels with no symbols display thereon are spun. In the example embodiment, as described above, prize symbols include WYSIWYG symbols, such as prize symbols including credit values (e.g., 25 credits) and/or jackpot values (e.g., a jackpot prize symbol 804). At the end of the bonus game, the player is awarded with all of the prize values associated with bonus symbols displayed after the final spin (e.g., the tenth spin).

Further, game enhancements as described above may be awarded during play of the bonus game. Game enhancements as mentioned above may applied to the bonus game (e.g., multipliers, etc.), or additional enhancements specific to the bonus game such as being awarded an additional number of free spins.

While in the example embodiment a keno-style game played in gaming environments (e.g., environments 400, 500) with game enhancements was described, it should be appreciated that a wide variety of games may be played on EGMs in the environments described herein. For instance, EGMs 402-406 could operate a bingo-style, card-style, and/or a roulette-style game, each with game enhancements. Some game enhancements may be unique to the style of game being played. For example, in a card-style game, a game enhancement could be a card being replaced with a WYSIWYG symbol as described above An example roulette-style game with game enhancements may be provided. A roulette wheel may be displayed on a display device (e.g., display devices 408-412) including 37 or 38 traditional roulette wheel positions (depending on inclusion of "0" and/or "00"). A player may place a wager based on which number(s) they predict a ball will land on, as is customary in roulette games. However, in this example embodiment, if the ball lands on a position associated with a number wagered on by the player, the position may transition to being a reel. The reel will then spin, and a player may be awarded with an additional prize/game enhancement (e.g., additional award amount (credits, cash, etc.), a progressive jackpot win, a free car, etc.). In some embodiments, the additional prizes/game enhancements that may be awarded to a player may change based on a wager amount place by a player and/or the amount of numbers selected by the player. For example, if a player selects only a single number and the ball lands on a position with that number displayed thereon, the player may be eligible to win higher value prizes than they would have if they had selected, as example, four different positions the ball may land on. Similar prizes/game enhancements may be presented to the player based on other wagers traditionally associated with roulette games (e.g., red/black, even/odd, etc.). In some embodiments, for the position to transition/convert to being a reel, a player may be required to place an additional wager, a side wager, and/or the player wager on the roulette game may be adjusted to fund the reel spin.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
a gaming table comprising a plurality of gaming stations, wherein each gaming station of the plurality of gaming stations is associated with at least one display device of a plurality of display devices;
a community display device associated with the plurality of gaming stations;
at least one memory with instructions stored thereon; and
at least one processor in communication with the at least one memory, wherein the instructions, when executed by the at least one processor, cause the at least one processor to:
cause display of a first animation at the community display device, wherein the first animation indicates that a game enhancement will be provided in an electronic game at one or more gaming stations of the plurality of gaming stations;
concurrent with display of the first animation, cause display of a second animation at a first display device of the plurality of display devices, wherein the first display device is associated with a first gaming station of the plurality of gaming stations, and wherein the second animation is associated with the game enhancement and indicates that the one or more gaming stations of the plurality of gaming stations where the game enhancement will be provided includes the first gaming station; and
cause display of a third animation at the first display device while the game enhancement is provided to indicate that the game enhancement is being provided in the electronic game at the first gaming station.

2. The electronic gaming system of claim 1, wherein the instructions further cause the at least one processor to determine that another game enhancement will be provided in another electronic game displayed at a third display device of the plurality of display devices.

3. The electronic gaming system of claim 2, wherein the first display device and the third display device are included in an electronic gaming table, and wherein the instructions further cause the at least one processor to cause display of a fourth animation between the first display device and the third display device to indicate that the another game enhancement will be provided at the another electronic game.

4. The electronic gaming system of claim 3, wherein the game enhancement and the another game enhancement are at least one of a same game enhancement or a different game enhancement.

5. The electronic gaming system of claim 3, wherein the electronic game and the another electronic game are at least one of a same electronic game or a different electronic game.

6. The electronic gaming system of claim 3, wherein the instructions further cause the at least one processor to cause display of the fourth animation travelling around at least a portion of the electronic gaming table before arriving at the third display device.

7. The electronic gaming system of claim 1, wherein the instructions further cause the at least one processor to determine that the game enhancement will be provided in the electronic game displayed at the first display device based at least in part upon at least one message received from a server.

8. The electronic gaming system of claim 1, wherein the game enhancement comprises at least one of applying a multiplier, increasing a progressive jackpot, or providing at least one additional player selection in the electronic game.

9. The electronic gaming system of claim 1, wherein the electronic game includes a plurality of reels, and wherein the instructions further cause the at least one processor to:

determine a number of selected reels, of the plurality of reels, for the electronic game;

determine, for each reel of the plurality of reels, a respective reel symbol of a plurality of reel symbols to be displayed; and provide a game outcome for the electronic game based at least in part upon the respective reel symbols displayed at the number of selected reels and the game enhancement.

10. The electronic gaming system of claim 9, wherein the instructions further cause the at least one processor to determine the respective reel symbols based at least in part upon at least one message received from a server.

11. The electronic gaming system of claim 9, wherein the instructions further cause the at least one processor to cause a bonus game to be triggered based at least in part upon the respective reel symbols displayed at the number of selected reels.

12. At least one non-transitory computer-readable storage medium associated with an electronic gaming system, the electronic gaming system comprising:

a gaming table comprising a plurality of gaming stations, wherein each gaming station of the plurality of gaming stations is associated with at least one display device of a plurality of display devices; and a community display device associated with the plurality of gaming stations, wherein the at least one non-transitory computer-readable storage medium includes with instructions stored thereon that, in response to execution by at least one processor, cause the at least one processor to:

cause display of a first animation at the community display device, wherein the first animation indicates that a game enhancement will be provided in an electronic game at one or more gaming stations of the plurality of gaming stations;

concurrent with at least part of display of the first animation, cause display of a second animation at a first display device of the plurality of display devices, wherein the first display device is associated with a first gaming station of the plurality of gaming stations, and wherein the second animation is associated with the game enhancement and indicates that the one or more gaming stations of the plurality of gaming stations where the game enhancement will be provided includes the first gaming station; and cause display of a third animation at the first display device while the game enhancement is provided to indicate that the game enhancement is being provided in the electronic game at the first gaming station.

13. The at least one non-transitory computer-readable storage medium of claim 12, wherein the instructions further cause the at least one processor to determine that another game enhancement will be provided in another electronic game displayed at a third display device of the plurality of display devices.

14. The at least one non-transitory computer-readable storage medium of claim 13, wherein the first display device and the third display device are included in an electronic gaming table, and wherein the instructions further cause the at least one processor to cause display of a fourth animation between the first display device and the third display device to indicate that the another game enhancement will be provided at the another electronic game.

15. The at least one non-transitory computer-readable storage medium of claim 12, wherein the instructions further cause the at least one processor to cause display of at least one of the first animation, the second animation, or the third animation by transmitting at least one message to an electronic gaming device associated with at least a portion of the plurality of display devices.

16. The at least one non-transitory computer-readable storage medium of claim 12, wherein the electronic game includes a plurality of reels, wherein the instructions further cause the at least one processor to:

determine a number of selected reels, of the plurality of reels, for the electronic game;

determine, for each reel of the plurality of reels, a respective reel symbol of a plurality of reel symbols to be displayed; and provide a game outcome for the electronic game based at least in part upon the respective reel symbols displayed at the number of selected reels and the game enhancement.

17. The at least one non-transitory computer-readable storage medium of claim 16, wherein the instructions further cause the at least one processor to provide the game outcome by transmitting at least one message to an electronic gaming device associated with the first display device.

18. A method of electronic gaming implemented by:

a gaming table comprising a plurality of gaming stations, wherein each gaming station of the plurality of gaming stations is associated with at least one display device of a plurality of display devices;

a community display device associated with the plurality of gaming stations;

at least one processor; and at least one memory, the method comprising:

causing display of a first animation at the community display device, wherein the first animation indicates that a game enhancement will be provided in an electronic game at one or more gaming stations of the plurality of gaming stations, and wherein the community display device is associated with the plurality of gaming stations;

concurrent with at least part of display of the first animation, causing display of a second animation at a first display device of the plurality of display devices, wherein the first display device is associated with a first gaming station of the plurality of gaming stations, and wherein the second animation is associated with the game enhancement and indicates that the one or more gaming stations of the plurality of gaming stations where the game enhancement will be provided includes the first gaming station; and causing display of a third animation at the first display device while the game enhancement is provided to indicate that the game enhancement is being provided in the electronic game at the first gaming station.

19. The method of claim 18, further comprising causing display of at least one of the first animation, the second animation, or the third animation based at least in part upon at least one message received from a server.

20. The method of claim 18, further comprising causing display of at least one of the first animation, the second animation, or the third animation by transmitting at least one message to at least one electronic gaming device associated with at least a portion of the plurality of display devices.

* * * * *